UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS AND FIRE-BRICK.

SPECIFICATION forming part of Letters Patent No. 266,146, dated October 17, 1882.

Application filed September 6, 1882. (No specimens.)

*To all whom it may concern:*

Be it known that I, JAMES HENDERSON, of Bellefonte, Centre county, and State of Pennsylvania, (formerly of New York city,) have invented certain new and useful Improvements in the Manufacture of Compounds for Furnace-Linings and Fire-Brick, of which the following is a specification.

The object of my invention is to produce a compound for refractory furnace-linings and fire-brick, which shall be extremely infusible or capable of resisting very high and long-continued heats, and which may be applied at very small expense.

In carrying out this my invention I take pure washed river-sand or silica or sea-sand or pulverized sandstone, which shall be free or practically so from substances that will render it fusible when used with the mineral binding agent hereinafter described. The sand is of sufficient fineness, preferably, to pass through a sieve of about three thousand six hundred meshes to the square inch. With this silica or sand I mix about five per cent. of calcined sulphate of lime or plaster-of-paris, by weight, also in a finely-divided state. To this I add enough water to permeate the mass, and the whole is worked until a thorough mixture is effected, when it is ready for use for walls or linings of reverberatory furnaces, metallurgic vessels, and other refractory uses when applied in the wet state and dried at the ordinary temperature; or it may be molded into brick, which are ready for use when dried at the ordinary temperature, or the brick may be baked in the usual manner.

I do not wish to be understood as confining my invention to the proportion of sulphate of lime herein given, as it is given merely to produce a refractory compound which will not contract or expand at high heats, and good fire-resisting compounds may be obtained when from one to fifteen per cent. is used to one hundred parts by, weight, of silica or sand.

The compound herein described may be mixed, if preferred, with a vegetable binding substance, such as glucose, starch, cellulose, dextrine, mucilage, gum-arabic or molasses dissolved in water, or with rye, wheat, rice, or corn flour, oat, pea, or bean meal, or wood pulp, or other substances from which starch or sugar may be derived, mixed with water to a thin paste; but I do not claim broadly, as a part of this invention, the mixture of these substances with sand or silica, as it is already described in application for Letters Patent made by me now pending.

What I claim, and desire to secure by Letters Patent, is—

1. The compound for furnace-linings and fire-brick, consisting of silica, sulphate of lime, and water, as specified and set forth.

2. The compound for furnace-linings and fire-brick, consisting of silica, sulphate of lime, and water, and a vegetable substance from which starch or sugar may be derived, as specified and set forth.

JAMES HENDERSON.

Witnesses:
 G. G. FRELINGHUYSEN,
 A. MOORE.